United States Patent [19]

Eggebrecht et al.

[11] Patent Number: 4,866,568
[45] Date of Patent: Sep. 12, 1989

[54] INTEGRATED TRANSFORMER SECTIONALIZING SWITCH ASSEMBLY

[75] Inventors: Roland C. Eggebrecht, West Allis; Aaron A. McIlheran, Burlington; William H. Lane, Delafield; Robert A. Richardson, Waukesha, all of Wis.

[73] Assignee: ASEA Electric, Inc., Waukesha, Wis.

[21] Appl. No.: 87,812

[22] Filed: Aug. 21, 1987

[51] Int. Cl.$^4$ ............................................. H02B 5/00
[52] U.S. Cl. ..................................... 361/333; 361/341; 361/342
[58] Field of Search ............... 200/50 AA; 307/147; 361/332–335, 341, 342, 347, 349, 350, 355, 357, 361

[56] References Cited

U.S. PATENT DOCUMENTS

| | | | |
|---|---|---|---|
| 2,542,853 | 2/1951 | Wills | 361/334 |
| 2,997,627 | 8/1961 | Egglegood | 361/342 |
| 3,052,820 | 9/1962 | Kreekon et al. | 361/340 |
| 3,403,239 | 9/1968 | Schramm et al. | 361/335 |
| 3,562,593 | 2/1971 | Bould | 361/342 |
| 4,360,849 | 11/1982 | Harris et al. | 361/333 |
| 4,689,716 | 8/1987 | Cooper et al. | 361/335 |

Primary Examiner—A. D. Pellinen
Assistant Examiner—Gregory D. Thompson
Attorney, Agent, or Firm—Foley & Lardner

[57] ABSTRACT

An integrated transformer-sectionalizing switch assembly including a transformer module having a low profile feeder module mounted on and connected to the transformer module. The feeder module including two pair of circuit breakers mounted in side by side relation on each side of the feeder module with each pair of circuit breakers in back to back relation with the other pair of circuit breakers. A bare bus network is used to interconnect the secondary phase bushings to the circuit breakers. The bus network including three bus bars, each bus bar being connected to a phase busing. Each bus bar also including a phase connector connected to each circuit breaker. The phase connectors on each bus bar being arranged to correspond to the location of the same phase contact on each circuit breaker so that the circuit breakers can be interchanged. The feeder module is also provided with a compartment for a low potential transformer assembly.

8 Claims, 5 Drawing Sheets

INTEGRATED TRANSFORMER SECTIONALIZING SWITCH ASSEMBLY

BACKGROUND OF THE INVENTION

The transmission of electrical power from electric generator to residential areas involves a combination of transmission devices which make up a transmission system. The present application is concerned with a distribution substation of the type used to step the voltage down from the transmission voltage to a distribution voltage of 5 to 35 KV. A distribution substation of the type contemplated herein is shown in U.S. Pat. No. 4,360,849 which issued on Nov. 23, 1982 and is assigned to the assignee of the present application.

In the power distribution system disclosed in the above patent, a distribution substation is described which was designed to reduce the total costs, such as labor, equipment and land, at the power distribution level. This type of substation was designed to eliminate the conventional practice of providing the required components from a variety of sources, assemble and test those components at the substation site. This often resulted in a construction time table that was dependent upon the time required to deliver the last component. As an example, the transformer could take 26 weeks whereas the switchgear could take 40 to 50 weeks or vice versa resulting in a holding time of up to a half year of the parts received at the earlier date.

The power distribution system contemplated a prepackaged substation made up of independent modules which could be assembled at the point of manufacture, tested, disassembled, shipped to the customer site, and readily assembled at the substation site. All the components which make up the substation were engineered, selected, assembled and tested in the system by a single manufacturer. This system included the transformer, primary circuit breakers, low voltage switchgear, relays, meters, lightning arresters and all other required hardware accessories. The system was fully tested at the point of manufacture and retested after assembly at the site. Land costs were reduced since a single pad mount and a support pad were all that was required to accommodate the transformer and feeder modules.

SUMMARY OF THE INVENTION

The present invention contemplates a prepackaged power delivery system which combines all of the elements of the system into a single unit. The system includes a transformer having the feeder modules mounted directly on the transformer.

One of the principal features of the invention is the provision of a low profile feeder module which can be mounted directly on the transformer. All the elements of the feeder module are provided in a single housing with the low voltage circuit breakers mounted side-by-side on each side of the module.

Another feature of the invention is connection of the input bushings to the low-voltage circuit breaker assemblies through open bus connections.

Other principal features and advantages of the invention will become apparent to those skilled in the art upon a review of the following detailed description, claims and drawings.

DRAWINGS

Figure 1:
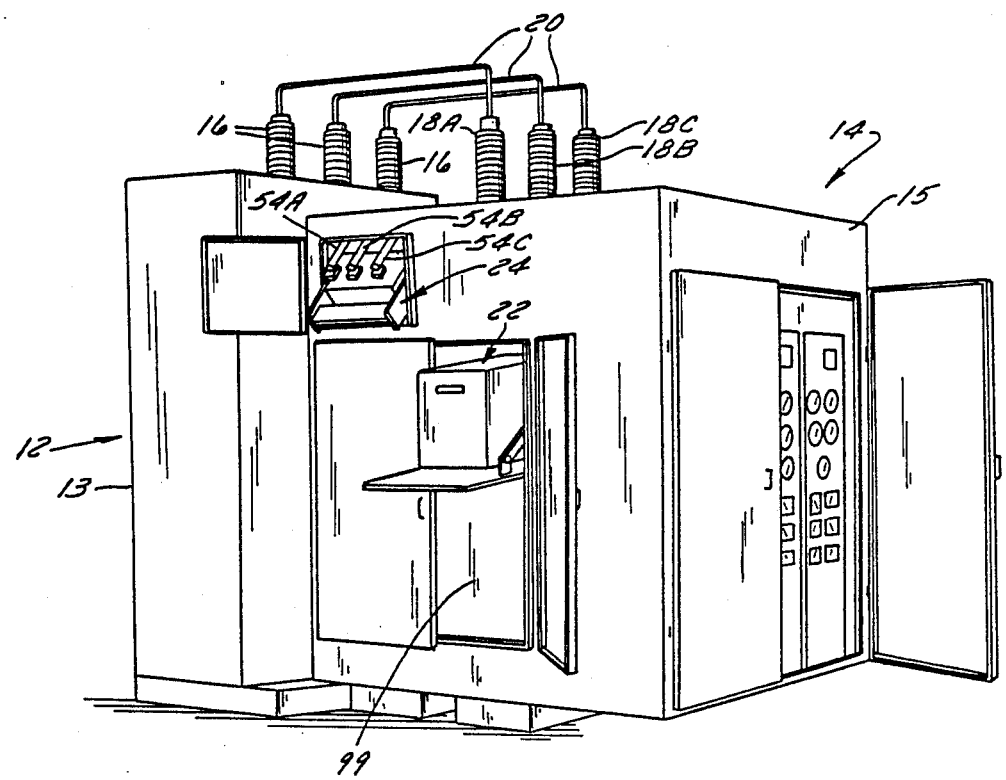
FIG. 1 is a perspective view of the power distribution system according to the present invention.

Although only one embodiment of the invention is explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein is for the purpose of description only and should not be regarded as limiting.

DETAILED DESCRIPTION OF THE INVENTION

The power delivery system according to the invention generally includes a transformer module 12 and a feeder module 14. As is generally understood, the transformer module 12 includes a tank 13, a transformer mounted in the tank, insulating oil filling the tank, primary bushings, secondary bushings, primary lightning arrestors, and primary circuit breakers (none of which are shown) which are all mounted directly on the transformer tank 13. These components are arranged as shown and described in the above-described U.S. Pat. No. 4,360,849. The secondary bushings 16 are shown mounted on the top of the transformer tank 13 and connected to the phase bushings 18A, 18B, 18C on the feeder module 14 by means of secondary conductors 20.

The feeder module 14 includes a housing 15 having feeder circuit breakers 22 and a potential transformer assembly 24 mounted within the housing 15. The phase bushings 18A, 18B, 18C are connected to the circuit breakers 22 by means of an open bus network 26. The potential transformer assembly 24 used herein is of the type described in U.S. Pat. No. 3,052,820 issued on Sept. 4, 1962, and entitled Transformer Tilt Out Trunnion Arrangement for Enclosed Cubicle Use. Since all of the feeder elements are housed within the housing 15 and are arranged in separate sections of the housing, the bus network 26 can be formed from bare bus bars since linemen will not be exposed to the network, thus eliminating the cost of using an insulated cable system.

Figure 2:
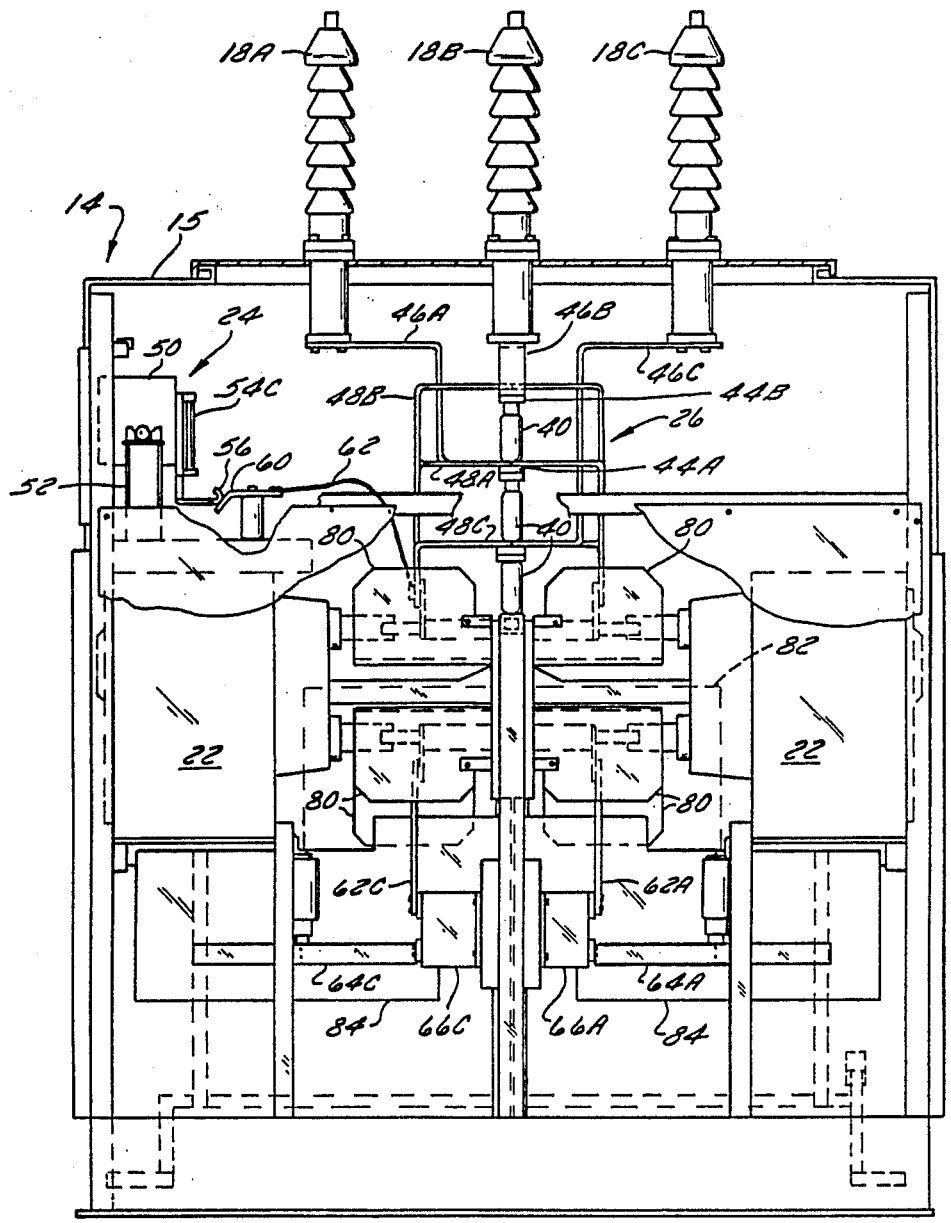
FIG. 2 is an end elevation view, partly in section, showing the bus work and the feeder line connection connections to the circuit breakers.
Figure 3:
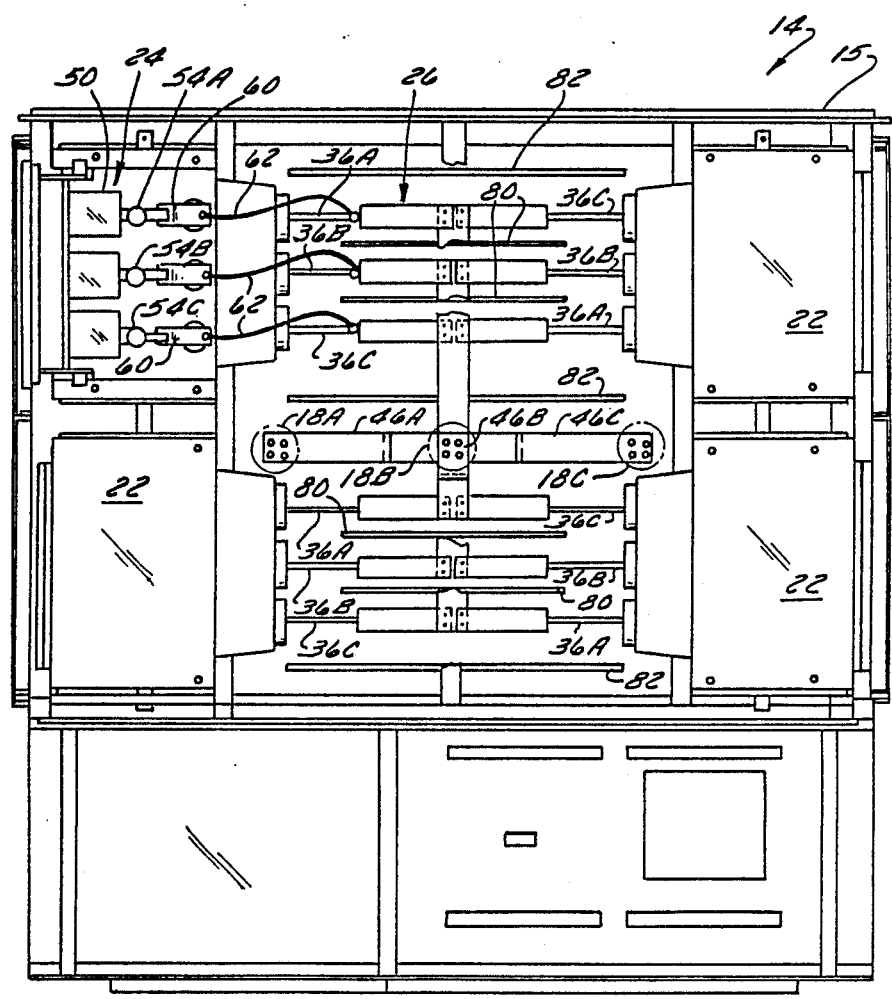
FIG. 3 is a top view in section showing the connection of the bus work to the circuit breakers.

The feeder module 4 as seen in FIGS. 2 and 3 includes four circuit breakers 22 of the SF6 type. These are conventional type circuit breakers which include a carriage 30 having a number of rollers or wheels 32 mounted on a track 34 for movement of the circuit breaker into the feeder module housing as seen in FIG.

Figure 5:
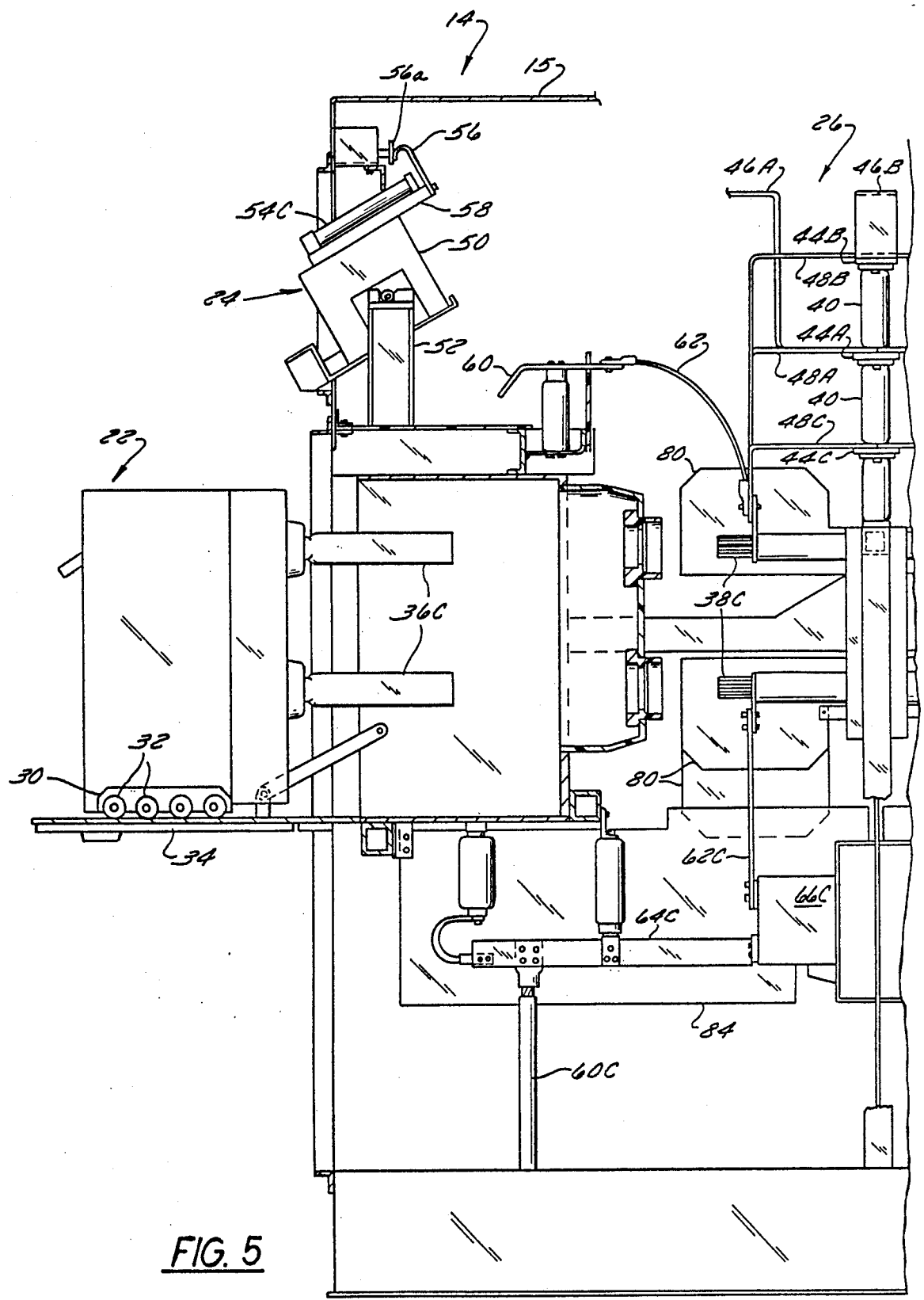
FIG. 5 is a section view showing one of the circuit breakers in the open position and the potential transformer fuse assembly in the disconnect position.

6 and out of the feeder module housing 15 as seen in FIG. 5. Each circuit breaker 22 includes three pair of electrical phase conductors 36A, 36B, 36C which are positioned to move into engagement with corresponding fixed spring-loaded contacts 38A, 38B, 38C mounted in the housing 15.

Means are provided within the housing to insulate the circuit breakers 22 from each other. Such means is in the form of insulation panels 80 provided between each phase of each circuit breaker 22 and insulation panels 82 provided on each side of each circuit breaker. Insulation panels 84 are also provided between each phase of the feeder cables 60A, 60B, 60C.

Figure 4:
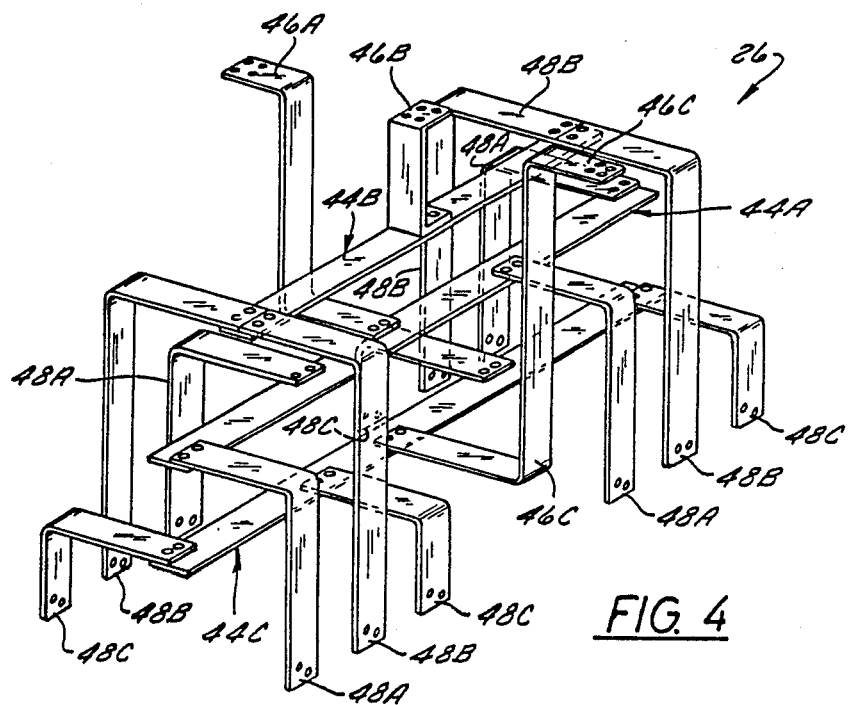
FIG. 4 is a perspective view of the bus work.
Figure 7:
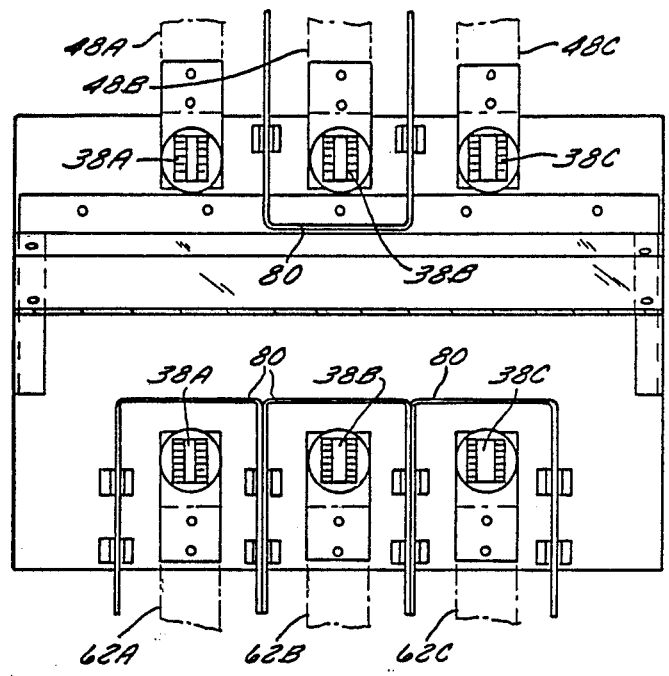
FIG. 7 is a view of the circuit breaker connections to the bus work for one of the circuit breakers.

The bus network 26 is mounted in the housing on insulators 40. As seen in FIG. 4, the bus network 26 includes three bus bars 44A, 44B, and 44C. Each bus bar 44A, 44B and 44C includes means in the form of bus connectors 46A, 46B and 46C for connecting the bus bars to the corresponding phase bushing 18A, 18B and 18C. Each bus bar also includes means in the form of bus connectors 48A, 48B and 48C for connecting the bus bars to the corresponding contacts 38A, 38B and 38C. It should be noted that the bus connectors 48A, 48B and 48C are arranged so that each circuit breaker can be connected to the bus network on either side of the network. Referring to FIG. 7, the upper circuit breaker contacts 38A, 38B, and 38C for one circuit breaker are shown connected to the bus bars 44A, 44B, and 44C and the lower contacts 38A, 38B, and 38C are shown connected to the feeder line connectors 62A, 62B, and 62C.

Figure 6:
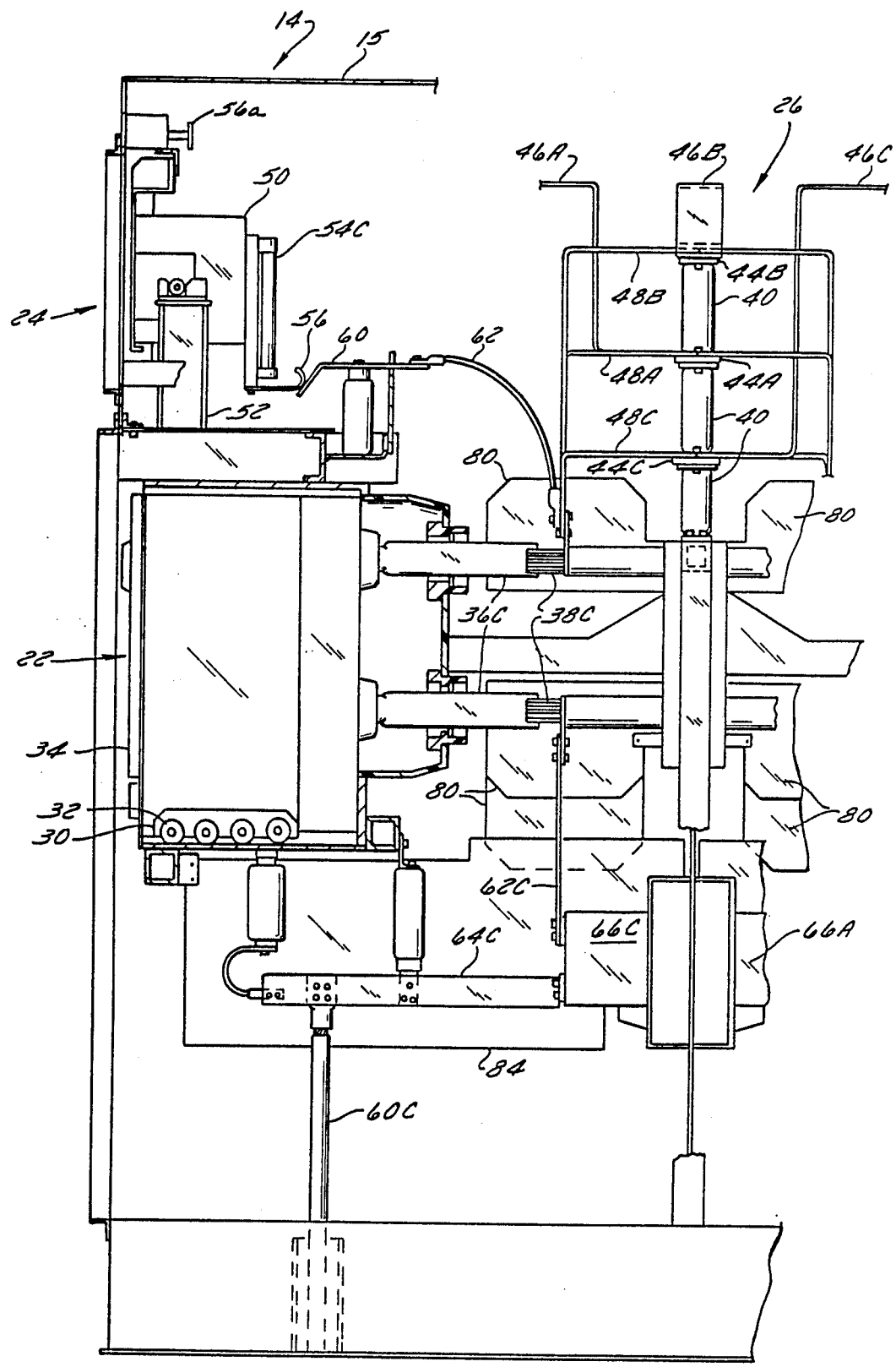
FIG. 6 is a view similar to FIG. 5 showing the circuit breakers in the closed position and the potential transformer fuse assembly in the closed position.

The potential transformer assembly 24 is of the type shown and described in the above U.S. Pat. No. 3,052,820. The assembly 24 includes low potential transformers 50 mounted for pivotal movement on each pair of supports 52 and a set of fuses 54A, 54B and 54C mounted on the transformers 50 and connected to the phase bus connectors 48A, 48B and 48C by means of a contact 56 mounted on the end of the fuse support 58. Contact 56 is rotated into engagement with a fixed contact 60 connected to the phase bus 48C by means of a conductor 62. The potential transformer assembly 24 is mounted off-center so that positive contact is made between contacts 56 and 60 as seen in FIG. 6, and positive disconnect and grounding to contact 56A when pivoted to the open position as seen in FIG. 5. The assembly 24 is used to disconnect the primary circuit of the potential transformers from the electrical bus network on fault of the potential transformers before access can be obtained to either the transformers or their primary fuses.

Figure 8:
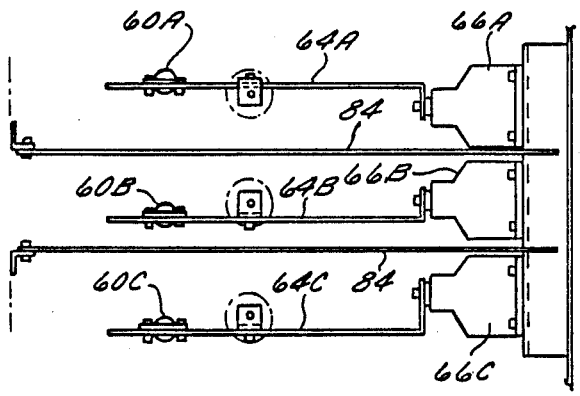
FIG. 8 is a view of the bus connections to the feeder lines.

Connection to the feeder cables 60A, 60B and 60C is made through connectors 62A, 62B and 62C and 64A, 64B and 64C through current transformers 66A, 66B and 66C as seen in FIG. 8. Access to the feeder lines is only possible after removal of safety barrier 99 as seen in FIG. 1.

Various features and advantages of the invention are set forth in the following claims.

We claim:

1. A feeder module for connecting a distribution transformer to a number of distribution feeder cables, said module including a housing having a phase bushing mounted thereon for each phase of the transformer, a pair of low-voltage circuit breakers mounted on each side of said housing in side by side relation, each circuit breaker including three pairs of phase contacts,
a bare bus network operatively connecting each of said phase bushings to one contact of each pair of phase contacts on each circuit breaker,
and means for connecting the other contact of each pair of said phase contacts to the corresponding distribution feeder cable.

2. The module according to claim 1 including a potential transformer assembly mounted for pivotal motion in said housing between engaged and disengaged positions.

3. The module according to claim 1 or 2 wherein said bus network includes a first bus bar having bus connectors positioned to engage one contact of one pair of contacts on each circuit breaker,
a second bus bar having bus connectors positioned to engage one contact of a second pair of contacts on each circuit breaker,
and a third bus bar having bus connectors positioned to engage one contact of a third pair of said contacts on each circuit breaker.

4. The module according to claim 3 including panel means for insulating each pair of contacts from each other and each circuit breaker from each other.

5. The module according to claim 2 wherein said transformer potential assembly includes a low potential transformer and fuse for each phase of the bus network.

6. The module according to claim 1 or 2 wherein said housing is adapted to be mounted on a transformer tank.

7. The combination of a feeder module for connecting a transformer module to a number of distribution feeder cables, the transformer module being of the type having a transformer tank,
a transformer in said tank,
insulating oil filling said tank and a number of secondary bushings connected to said transformer, and said feeder module comprising
a housing constructed and arranged to be mounted on the transformer tank,
said housing including a number of phase bushings connected to the corresponding secondary bushings,
two pair of low-voltage SF6 circuit breakers mounted side by side in said housing in back to back relation with said circuit breakers on each side of said housing,
a bare bus network for connecting each phase bushing to each of said circuit breakers,
a bare feeder bus connector for connecting each phase of each circuit breaker to the feeder cables,
a compartment in said housing and a potential transformer assembly mounted in said compartment and being operatively connected to said bare bus network.

8. The feeder module according to claim 7 wherein said bus network includes a first bus bar having a bus connector connected to each of said circuit breakers,
a second bus bar having a bus connector connected to each of said circuit breakers and
a third bus bar having a bus connector connected to each of said circuit breakers,
each of said bus connectors for each circuit breaker being located in the same position for each circuit breaker whereby said circuit breakers are interchangeable.

* * * * *